Nov. 28, 1967
E. V. ANDERSON
3,354,482
METHOD AND APPARATUS FOR SIMULTANEOUSLY
PERFORMING MULTIPLE FORMING OPERATIONS
Filed June 8, 1965
4 Sheets-Sheet 1
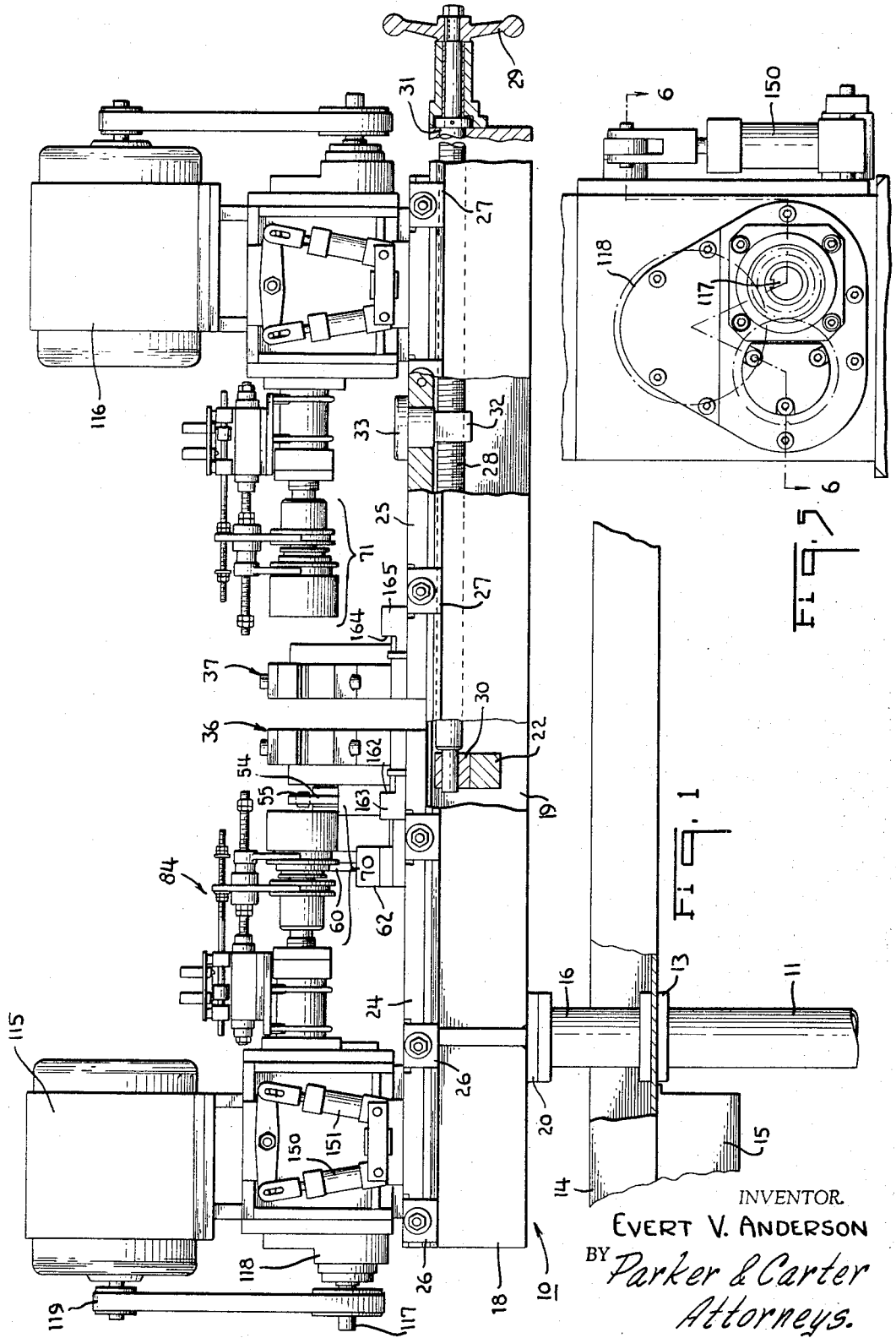
INVENTOR.
EVERT V. ANDERSON
BY *Parker & Carter*
*Attorneys.*

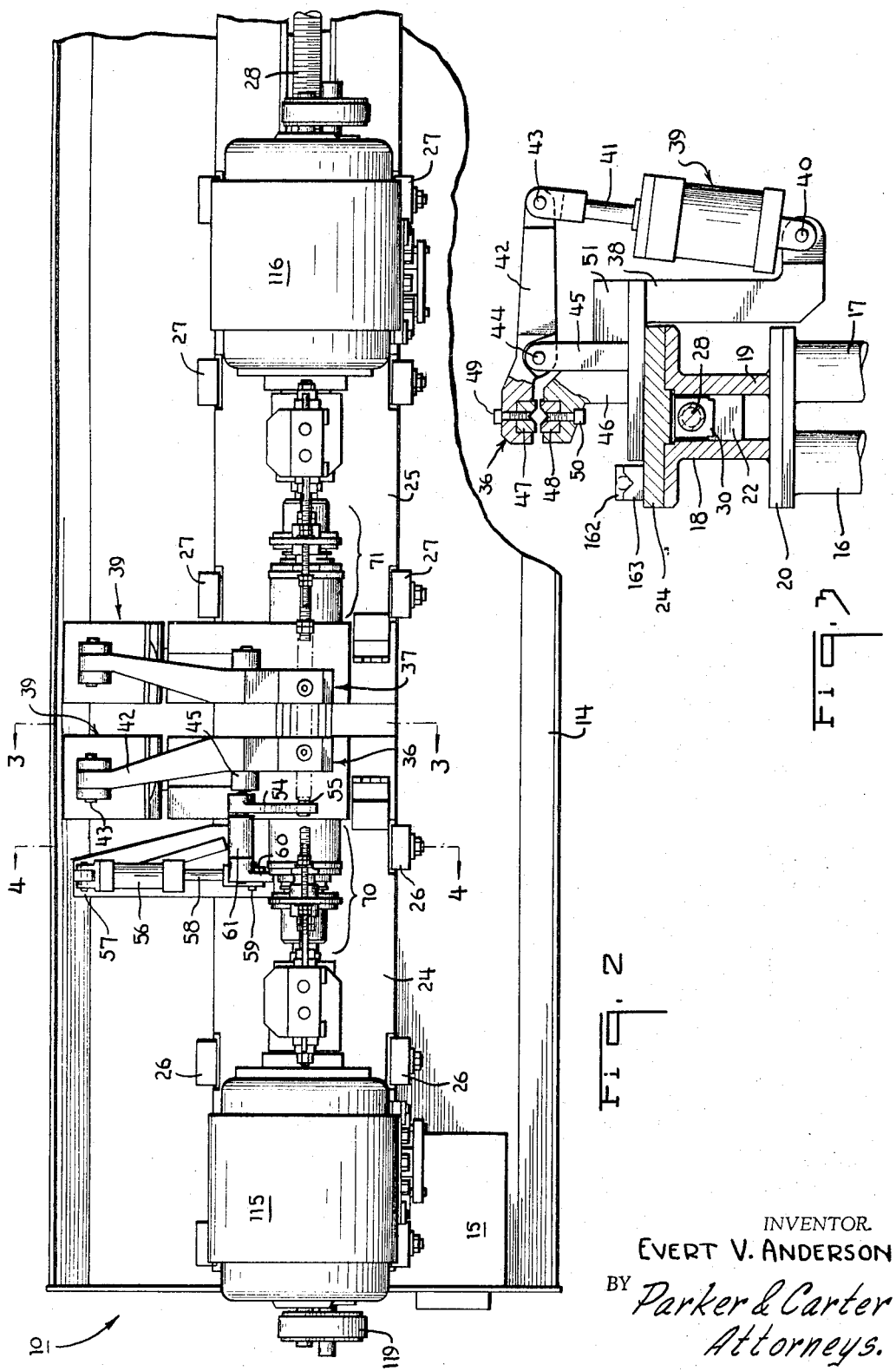

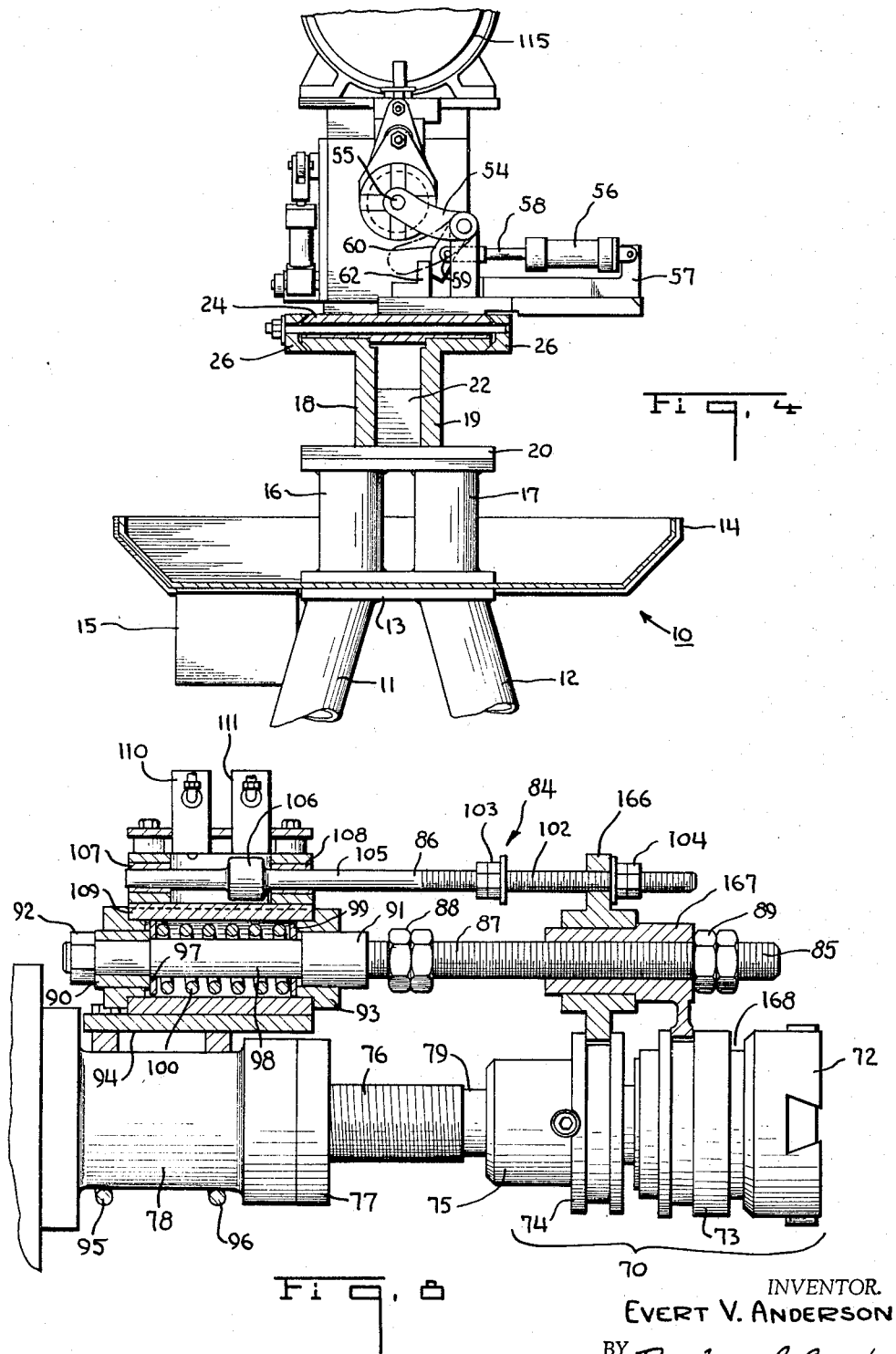

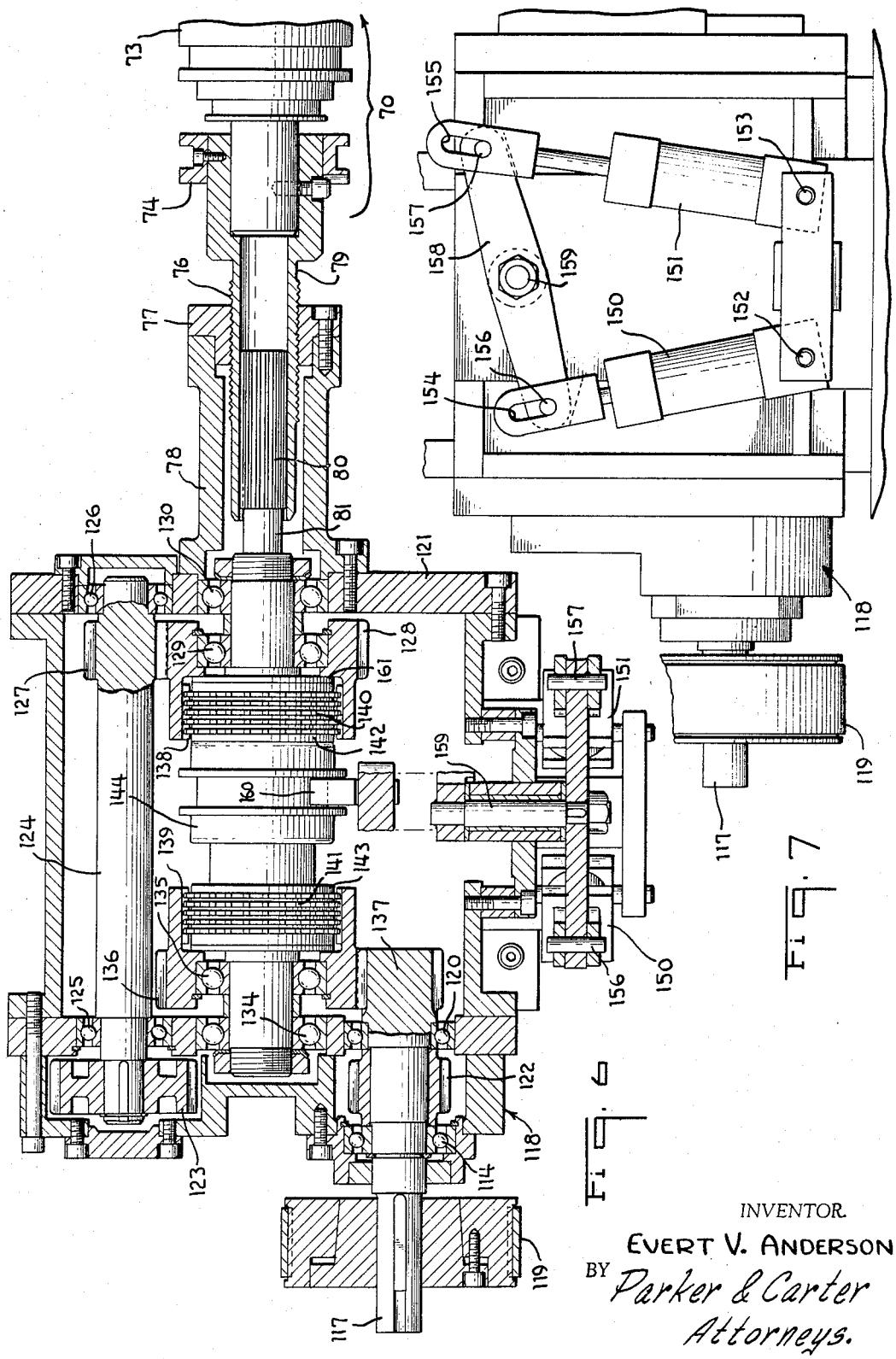

United States Patent Office 3,354,482
Patented Nov. 28, 1967

3,354,482
METHOD AND APPARATUS FOR SIMULTANEOUSLY PERFORMING MULTIPLE FORMING OPERATIONS
Evert V. Anderson, Chicago, Ill., assignor, by mesne assignments, to Westinghouse Air Brake Company, Pittsburgh, Pa., a corporation of Pennsylvania
Filed June 8, 1965, Ser. No. 462,323
8 Claims. (Cl. 10—92)

ABSTRACT OF THE DISCLOSURE

A method and apparatus for carrying out two forming operations, such as threading, on a workpiece simultaneously. When threading both ends of a shaft the thread cutters move radially outwardly from the axis of the shaft near the end of the longitudinal threading stroke until the cutters clear the exterior of the shaft, the motion of the cutters thereby having both a longitudinal and a radial component of movement simultaneously. Thereafter the cutters are longitudinally retracted at a faster rate than they were longitudinally advanced.

This invention relates to a method of and apparatus for simultaneously performing two forming operations on a single workpiece.

Accordingly, a primary object of the invention is to provide a method of performing two forming operations on one workpiece simultaneously.

Another object is to provide a method of simultaneously threading the opposite ends of a shaft in which the thread forming elements are continuously turned in a thread forming direction during the period of time said elements are being radially retracted from engagement with the workpiece.

Yet another object is to provide a method of performing a forming operation in which a forming tool is continuously advanced into and withdrawn radially outwardly from a workpiece with a multi-component stroke, said stroke having a free running component terminating at a nominally fixed stop, and a cushioning component which provides gradually increasing resistance to advancement from the end of the free running component of the stroke at the fixed stop until a time subsequent to the time at which the forming tool radially clears the workpiece.

Yet another object is to provide apparatus capable of performing the above described methods.

Other objects and advantages of the invention will be apparent from a reading of the following description of the invention.

The invention is illustrated more or less diagrammatically in the accompanying figures wherein:

FIGURE 1 is a side elevation with parts broken away for clarity showing the apparatus in a non-operative position;

FIGURE 2 is a top plan view with parts omitted and others broken away;

FIGURE 3 is a mechanism for releasably clamping and holding a workpiece, said view being taken substantially along the line 3—3 of FIGURE 2;

FIGURE 4 is a view taken substantially along the line 4—4 of FIGURE 2 with parts broken away for clarity;

FIGURE 5 is an end view of the drive mechanism;

FIGURE 6 is a sectional view taken substantially along the line 6—6 of FIGURE 5 illustrating the power transmission mechanism;

FIGURE 7 is a detail view of a portion of the clutch mechanism; and

FIGURE 8 is a detail view to an enlarged scale with parts broken away illustrating the free running and cushioning mechanism associated with the stroke of the thread forming elements.

Like reference numerals will be used to refer to like parts from figure to figure in the following description of the drawings.

The machine includes a stationary support structure indicated generally at 10 in FIGURES 1–4. The support structure includes a plurality of pairs of upwardly and inwardly angled legs 11, 12, each pair of legs being welded or otherwise suitably secured at their upper ends to a support plate 13. A chip and oil pan is indicated at 14 resting upon the plate 13. A sump is indicated at 15. A plurality of pairs of short, stubby posts extend vertically upwardly from the support legs, one pair of which is indicated at 16 and 17.

A stationary base structure which comprises essentially a pair of inverted L-shaped beams 18 and 19 extend upwardly from support plates 20 which rest on the upper end of the stub post assemblies. The base side beams 18 and 19 are maintained a substantially fixed distance apart by a plurality of spacers, one of which is indicated at 22. The base structure includes a carriage base composed of a fixed portion 24 and a slidable portion 25. A plurality of clamps are indicated at 26. The three clamps 26 at the left end of FIGURE 1 may be maintained in engagement at all times and the clamps 27 at the right edge of FIGURE 1 may be loosened for adjustment as needed.

Sliding carriage base 25 is actuated by the adjustment screw 28 under the control of hand wheel 29. The screw is journaled at 30, 31 and reciprocates sliding base 25 by means of the threaded collar 32 which extends downwardly from fastener 33 which in turn is fixed to the sliding base 25. It will be understood that once the sliding base 25 has been adjusted for a workpiece of a given dimension, the clamps 26 are tightened and the bases 24, 25 maintained in fixed relationship to one another until a different sized workpiece is provided.

A workpiece, such as a roller shaft which is to be threaded on each end, is held in a position fixed with respect to the supporting frame 10 by a pair of clamps indicated generally at 36 and 37. The clamp structures are identical for all practical purposes, though oppositely positioned, and a description of one will suffice for a description of both.

The left clamp 36 is shown best in FIGURE 3. It consists of a bracket 38 which is fixed to carriage base 24 and a clamp cylinder 39. The clamp cylinder is pivoted to an ear on the lower end of the bracket 38, as at 40, and its piston rod 41 is pivotally connected to the upper jaw holder 42 at 43. Jaw holder 42 is pivotally connected, as at 44, to a pivot post 45 which is fixed to and extends upwardly from the bracket 38. A lower jaw holder is indicated at 46. As best seen in FIGURE 3, the lower jaw holder is generally vertically aligned with the working end of upper jaw holder 42. A pair of jaws are indicated at 47 and 48 and jaw securement means at 49, 50. A reinforcing block is indicated at 51.

An assembly for locating the workpiece, such as the above-mentioned roller shaft, in exact position for a forming operation is indicated best in FIGURES 1, 2 and 4. The positioning means includes a shaft stop 54 having an abutment member 55 against which a workpiece to be formed is butted. In FIGURES 1, 2 and 4 the shaft stop is shown in its elevated, gauging position. It will be understood that after it has performed its function of providing an abutment for locating the workpiece with respect to the jaws, it is moved out of the path of travel of the forming tool. The position of the shaft stop is controlled by a linkage system actuated by shaft stop control cylinder 56. The cylinder is pivoted at its rearward end to a bracket structure 57, best seen in FIGURE 4, which is welded or otherwise suitably secured to the upper surface of fixed carriage base 24. The stop cylinder piston rod 58 is pivotally connected as at 59 to an arm 60 which is fixed with respect to shaft stop 54. As best seen in FIGURE 2, shaft stop 54 and link 60 are longitudinally spaced from one another by a member 61, all three members 54, 59 and 60 moving as a unit. A cylinder stroke stop is indicated at 62.

A pair of die head assemblies for threading the ends of a shaft held in clamps 36, 37 are indicated at 70 and 71. Again, since the two die head assemblies are substantially identical, a description of one will suffice for a description of both.

Referring now to FIGURE 8, die head assembly 70 is shown to consist of a die head 72, a tool expansion collar 73, a direction control collar 74 and a socket 75. As best seen in FIGURE 6, both the tool expansion collar 73 and the direction control collar 74 are fixed to and rotate with socket 75. The reduced end portion of socket 75 is externally threaded, as at 76, and received in a threaded bore in nut 77 which in turn is bolted to mounting collar 78. The reduced diameter portion 79 of the socket is hollow and splined at its innermost end to receive a spline 80 formed on the exterior of shaft 81, as will be further explained in detail hereinafter. The reduced diameter portion 79 of the socket forms in effect a feed shaft.

Referring to FIGURE 8 again, a mechanism for controlling the die head 72 is indicated generally at 84. The mechanism includes a die opening shaft 85 and a direction and depth of cut control shaft 86. Shaft 85 includes a threaded end 87 which carries a pair of adjustable stops 88, 89, the stops in this instance being shown as a pair of nuts. A pair of collar sections 90, 91 are carried on the left end of the shaft with a nut 92 holding the left collar 90 in place. The shaft is journaled in a stationary housing 93 which is welded or otherwise suitably secured to a platform structure 94 which is fixed to the mounting collar 78 by a pair of bands 95 and 96. A washer 97 is carried by the smooth surface portion 98 of the shaft, and a second washer 99 is butted against the inwardly extending lip of the right end of housing 93. A spring is indicated at 100 for a purpose which will appear hereinafter.

The direction and depth of cut control shaft 86 includes a threaded portion 102 which carries a pair of adjustable stops 103, 104 and a cam carrying section 105. A cam is indicated at 106, the cam being secured to shaft 86 and disposed between bearings 107, 108 which are secured to the barrel 109. A pair of cam actuated valves are indicated at 110, 111, each valve having a downwardly extending switch which is actuated by cam 106 and a connection to a source of air under pressure.

The driving mechanism for advancing and retracting the die head assembly 70 is indicated best in FIGURES 1, 6 and 7.

Referring first to FIGURE 1, a pair of electric motors are indicated at 115 and 116. Each motor supplies the driving power for its associated die head assembly 70 or 71. Again, since the power systems for each die head assembly are substantially the same, only one will be described in detail.

Motor 115 drives the input shaft 117 of a speed reducer 118 by a toothed belt 119. By suitable variation of the diameter of the driving and driven pulleys associated with the belt a speed reduction can be effected if desired.

Speed reducer input shaft 117 rotates in bearings 114, 120 which are carried by the housing of speed reducer 118 and gear box 121. A drive pinion is indicated at 122, this pinion being in engagement with a larger advance gear 123 as can be best visualized from the section line of FIGURE 5. The advance gear is carried by advance shaft 124 which is supported in bearings 125, 126. The opposite end of shaft 124 carries an advance pinion 127 which is in engagement with gear 128. Gear 128 is supported internally on the outer race of a bearing 129 which surrounds feed shaft 81. Another supporting bearing is indicated at 130.

Shaft 81 is supported at its left end in another pair of bearings 134, 135. A retracting gear is indicated at 136, said gear being in engagement with retracting pinion 137 formed on the innermost end of the speed reducer shaft 117.

Each of gears 128 and 136 is formed with an inwardly extending, internal spline, the splines being indicated at 138, 139 respectively. A pair of clutch packs 140, 141 are carried by expanded diameter collars 142, 143 which rotate with shaft 81. Clutch member 144 reciprocates from the position illustrated in FIGURE 7 backward into abutting contact with the right end of clutch pack 141 to alternately actuate clutch 140, 141. In the illustrated position, with clutch 140 engaged, power from advancing shaft 124 is transferred into advancing gear 128 which in turn rotates shaft 81 in an advancing direction.

The clutch mechanism for controlling the direction of rotation of shaft 81 is illustrated best in FIGURES 6 and 7. The mechanism consists essentially of a pair of clutch cylinders 150, 151 which are pivoted at their lower ends, as at 152, 153, to the carriage. The piston rod of each cylinder carries a lost motion connection at its outermost end, the lost motion connection in this instance being shown as a slot 154, 155 respectively. Each slot receives a pin 156, 157 carried by pivoted clutch lever 158. Eccentric shaft member 159 controls actuator 160 which slides member 144 to the right or left, depending upon whether advancing or retracting motion of the shaft 81 is desired. In the illustrated position of FIGURES 6 and 7, the member 144 has been moved to the right to bring clutch pack 140 into clutching contact with backup plate 161 and thereby cause shaft 81 to rotate in an advancing direction.

The use and operation of the invention are as follows:

In the position of FIGURES 1 and 2, the machine is shown in an at rest position.

The operator rotates hand wheel 29 to move sliding carriage base 25 to a desired position. Since the right face 162 of gauge block 163 lies in the same vertical plane as the right face of abutment member 55, the operator may lay a workpiece in the gauge block as indicated in FIGURE 3 and run the sliding carriage base 25 to the left until the left vertical face 164 of the right gauge block 165 abuts the right end of the workpiece. By this operation the proper spacing of die heads 70, 71 is established. As soon as the relative positions of the carriage base sections 24, 25 have been established, clamps 27 are tightened to fix the carriage base 25 to the support frame.

To perform a forming operation on a workpiece, the clamp cylinders 39 are actuated to open jaws 47 and 48. It will be understood that any suitable system may be employed for actuating these cylinders including an electronic, mechanical, or pneumatic system, the details of which are well within the scope of those skilled in the art. In the construction shown, a pneumatic system has been employed.

The workman then places the workpiece, which may for example be a shaft the ends of which must be threaded, onto the lower jaws 48 of the clamp mechanisms 36, 37. At this time the shaft stop 54 is in the position indicated in FIGURES 1 and 4. The operator merely drops the workpiece onto the lower jaws and slides it to the left until the left end of the workpiece abuts the stop 55 on the shaft stop. The clamp cylinders are then actuated to close the jaws against the workpiece and firmly hold it during the succeeding operations. Thereafter any suitable mechanism, including a time delay device or even a signal deteriorating system in a pneumatic system, may be employed for actuating the stop cylinder 56 and thereby dropping shaft stop 54 downwardly into the dotted line position of FIGURE 4. It will be understood that the cylinder stroke stop block 62 may be adjusted forwardly and transversely of the carriage base in order to accurately locate the shaft stop in its elevated working position.

At this point in the cycle the operation of die head assemblies 70 and 71 is substantially identical until the completion of performance of the forming operation on the workpiece. Accordingly, the function of only die head assembly 70 will be described.

Referring now primarily to FIGURE 8, and incidentally to FIGURES 6 and 7, the following will be observed.

With the clutch mechanism in the position of FIGURES 6 and 7, power from motor 115 rotates shaft 81 in an advancing right-handed thread direction. That is, with member 144 in the position of FIGURE 6, power at the input end of shaft 117 is transferred from drive pinion 122 to driven gear 123, and thence from pinion 127 to gear 128. Rotation of gear 128 induces rotation of shaft 81 in a thread-forming direction because of the engagement of clutch pack 140. As drive shaft 81 rotates, socket 79 is moved to the right, the splines on shaft 81 and socket extension 79 sliding relative to one another as the threaded portion 76 moves through the threaded aperture in nut 77.

At the commencement of movement, and referring now particularly to FIGURE 8, the direction and depth of cut control shaft 86 is in a leftward position. That is, cam 106 is directly beneath the switch of valve 110. Yoke follower 166 is located leftward of its illustrated FIGURE 8 position. Specifically, the left edge of follower 166 is aligned with the left edge of follower 167. Furthermore, die head 72 is in abutting engagement with tool expansion collar 73 and there is no space therebetween, as indicated in FIGURE 8.

Now, as feed shaft 79 rotates in a direction to advance outwardly, that is, to the right, as viewed in FIGURE 8, yoke followers 166 and 167 move together at the same rate of speed until follower 166 strikes stop 104. As soon as contact is made between follower 166 and stop 104, cam 106 starts to move toward the right. Shortly thereafter, yoke follower 167 strikes stop 89 and at this point the tool expansion collar 73 stops advancing to the right.

Feed shaft 79 continues to rotate however, and drive die head 72, direction control collar 74, direction and control shaft 86, and the cam to the right. As soon as relative movement occurs between the tool expansion collar 73 and the feed shaft assembly 79 the space indicated at 168 begins to form. It will be understood that the die head, which can be any one of a number of conventional types, immediately begins to open up because of a wedging action formed by the relative movement between the die head and the tool expansion collar. The chasers, or thread formers, are thus simultaneously moving to the right in a cutting direction and moving radially outwardly from the axis of the workpiece.

Rightward movement of the above components occurs until cam 106 actuates valve 111. This necessarily occupies some time, and while this is occurring, yoke follower 167 is in abutting engagement with abutment 89. In order to accommodate a slight rightward movement of the die head assembly which is now in the illustrated FIGURE 8 position, spring 100 is depressed. In effect, the spring provides an override cushioning effect which provides a gradually increasing resistance to the rightward movement of shaft 85, but permits the movement for a long enough period to enable cam 106 to actuate valve 111.

As soon as valve 111 is actuated, the auxiliary circuit, the components of which are conventional and are not set forth in detail here for the sake of simplicity and clarity, is actuated to retract the piston of clutch cylinder 151, and extend the piston of clutch cylinder 150.

As lever 158 is moved about its pivot, member 144 is shifted from the illustrated FIGURE 6 position to the left. When member 144 makes contact with the right end of clutch pack 141, gear 136 is caused to rotate in power transmitting relationship with pinion 137. It will be noted that since the pressure has been relieved from clutch pack 140, pinion 127 and gear 128 merely rotate with respect to one another but do not transfer power from one another.

As soon as the clutch pack 141 is actuated, power is delivered from the left end of input shaft 117 to shaft 81 to drive it in a retracting direction. Although advance gear 123 remains in contact with advancing pinion 122, these members merely rotate with respect to one another and do not transfer any power.

It will be noted that the rate of advance of shaft 81 is slower than its rate of retraction because of the step down gearing provided by shaft 124 and gears 123 and 127. This minimizes the time period during which the die head 72 is not in cutting engagement with the workpiece and materially shortens the cycle time.

After die head 72 clears the left end of the workpiece, which is still clamped between jaws 47 and 48, the auxiliary system functions to retract piston rod 41 of clamp cylinder 39 and swing upper jaw 42 clockwise around its pivot 44. This unclamps the workpiece and it may now be removed by the operator. At the same time that clamp cylinder 39 is being actuated to unclamp the workpiece, shaft stop 54 is swung upwardly to the FIGURE 4 position preparatory to reception of the next workpiece.

Valve 110 in FIGURE 8 provides a neutral position by pressurizing both of cylinders 150 and 151 simultaneously. Lever 158 is thereby moved to a horizontal or neutral position in which both clutches 140, 141 are disengaged. Slots 154 and 155 permit movement of lever 158 to the neutral position.

Clamps 36, 37 are released after the clutch moved to the neutral position. Stop 54 then swings into the FIGURE 1 position preparatory to placement of the next succeeding workpiece. The formed workpiece is removed, a new workpiece inserted, and the cycle is then reinitiated by actuation of the start button which causes lever 158 to move to the FIGURE 1 position, and the clutch to the FIGURE 6 position.

This cycle is then repeated.

It will be noted that the advancing movement of die head 72 consists of essentially two movement components. The first movement component is one in which the die head advances linearly with the thread chasers maintained a substantially fixed radial distance from the longitudinal center of the workpiece.

Once yoke follower 167 has made contact with adjustable stop 89, and relative movement occurs between die head 72 and tool expansion collar 73, a radially outward movement is superimposed on the longitudinally rightward movement of the die head with the result that the thread chasers are simultaneously radially withdrawn from engagement with the workpiece while they are advanced into it until the chasers completely clear the workpiece. It will be understood that it is well within the scope of the art for the opening movement of the thread chasers to occur for a short time span past the time the thread chasers are disengaged from the workpiece in order to provide adequate clearance.

Although a preferred embodiment of the invention has been illustrated and described, it will at once be apparent to those skilled in the art that numerous modifications may be made within the spirit and scope of the invention. It is therefore intended that the scope of the invention be limited not by the scope of the foregoing exemplary description but solely by the scope of the hereinafter appended claims.

What is claimed is:
1. Apparatus for simultaneously forming the ends of a workpiece, said apparatus including, in combination,
   means for holding a workpiece in a fixed position during the forming operation,
   a pair of forming tools, one for each end of the workpiece,
   means for advancing the forming tools into forming engagement with the workpiece,
   means for disengaging the forming tools from the workpiece, and
   means for maintaining the forming tools in advancing relationship to the workpiece until the forming tools are disengaged from the workpiece.
2. The apparatus of claim 1 further including
   means for retracting the forming tools after disengagement from the workpiece.
3. The apparatus of claim 1 further including
   means for retracting the forming tools at a faster rate than they are advanced.
4. The apparatus of claim 1 further including
   stop means positionable in the path of movement of the forming tools for locating the workpiece in a preselected initial position, and
   means for moving the stop means out of the path of movement of the forming tools only after actuation of the holding means.
5. The apparatus of claim 4 further characterized in that the forming tools are thread chasers.
6. Structure for providing overtravel to a thread forming tool to accommodate further movement of the tool having a longitudinal component after attaining an initial position, such structure including, in combination,
   a first travel control member carried by the tool,
   initial stop means effective to exert a restraining effect on the first travel control member after the tool reaches an initial limit of travel position,
   a second travel control member carried by the tool,
   means enabling the second travel control member to move relative to the first travel control member after said first travel control member reaches its initial limit of travel position,
   secondary stop means for causing the first and second travel control members to move together, and
   yieldable means which provides a gradually increasing resistance to simultaneous movement of the first and second travel control members.
7. A method of simultaneously threading the opposite ends of a shaft, said method including, in combination, the following steps:
   locating a workpiece in a fixed, preselected position,
   cutting a thread on each end of the workpiece simultaneously utilizing a threading tool for each thread-cutting operation, said thread-cutting operations proceeding in approaching directions,
   maintaining the threading tools a substantially constant radial distance from the longitudinal axis of the workpiece during a first component of threading movement,
   and thereafter, upon attainment of a nominal terminal point, simultaneously radially retracting each forming tool from the workpiece as each tool continues to advance longitudinally into the workpiece, and
   maintaining the simultaneous longitudinally advancing and radially retracting movement of each tool until each tool has cleared the workpiece.
8. The method of claim 7 further characterized in that each tool is retracted from the workpiece at a faster lineal rate than it is advanced thereinto.

References Cited

UNITED STATES PATENTS

| 1,232,708 | 7/1917 | Moon | 10—92 |
| 1,914,085 | 6/1933 | Gabriel | 10—92 |
| 2,235,908 | 3/1941 | Tyne | 10—92 |

HARRISON L. HINSON, *Primary Examiner.*